United States Patent [19]

Hawkins

[11] 4,265,585
[45] May 5, 1981

[54] LOADING DEVICE FOR VEHICLE BEDS

[76] Inventor: Wallace H. Hawkins, Rte. 7, Old Buncombe Rd., Greenville, S.C. 29609

[21] Appl. No.: 55,896

[22] Filed: Jul. 9, 1979

[51] Int. Cl.³ .............................................. B60P 1/54
[52] U.S. Cl. .................................................... 414/541
[58] Field of Search .............. 414/541, 542, 563, 728; 212/8 R, 46 A, 58, 59; 254/139.11

[56] References Cited

U.S. PATENT DOCUMENTS

| 2,747,754 | 5/1956 | Maynard | 414/541 |
| 3,276,610 | 10/1966 | Thatcher | 414/541 |
| 3,797,672 | 3/1974 | Vermette | 414/542 |

FOREIGN PATENT DOCUMENTS 788303  6/1968  Canada ..................................... 414/542

Primary Examiner—James B. Marbert
Attorney, Agent, or Firm—Bailey, Dority & Flint

[57] ABSTRACT

A loading device is illustrated for wheeled vehicles having elongated beds wherein a pair of transversely aligned boom members having an extensible inverted U-shaped member adjustably carried on free ends thereof, are pivotally secured on a supporting frame and operated by fluid operated cylinder assemblies which are pivotally connected on one end to a respective boom and on the other end to an upright frame member or standard carried forwardly in the vehicle.

4 Claims, 6 Drawing Figures

LOADING DEVICE FOR VEHICLE BEDS

BACKGROUND OF THE INVENTION

Several devices have been provided in the prior art for facilitating the loading of vehicles, particularly pickup trucks and the like. A substantially U-shaped inverted boom arrangement is illustrated in U.S. Pat. No. 3,276,610 wherein marginal frame portions are carried on an upper portion of the body of the pickup truck with a winch operated device for raising and lowering the boom member. Suitable winch operated means are suspended from the transverse portion of the U-shaped boom for raising a load from the ground and then by pivoting for moving same inside the truck body for deposit therein. Another similar apparatus is illustrated in U.S. Pat. No. 3,794,192 wherein a folding support frame is provided which will collapse into a compact storage position on the top of the hauling portion of the pickup truck.

SUMMARY OF THE INVENTION

It has been found that a loading device may be provided for pickup trucks and the like wherein an inverted substantially U-shaped extensible boom may be pivoted on a frame extending on each side of the bed, and a pair of hydraulic cylinder assemblies mounted between the boom and corner standards carried adjacent the forward portion of the bed for moving the boom carrying winch means for engaging a load exteriorly of the bed and raising same for positioning forwardly on the bed of the truck.

Accordingly, an important object of the present invention is to provide a fluid operated substantially U-shaped boom arrangement which is pivotably carried in inverted position on the bed of a pickup truck and which may be raised and lowered to swing loads such as assembled pieces of equipment, palletized loads, and the like in one or more operations into the loading bed.

Devices constructed in accordance with the present invention are versatile and may be hydraulically or electrically operated or both as in the instance of the preferred embodiment illustrated herein.

Another important object of the invention is to provide a universal mounting arrangement which will fit any pickup truck and which will require the drilling of holes only for the purpose of attaching the frame member at positions along the frame of the bed portion of the truck and along the upper portions of the body extending along the bed. Extensible means are provided for raising the boom so as to accommodate tall loads which must pass therebeneath when being loaded onto the pickup truck between the sides of the loading body.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
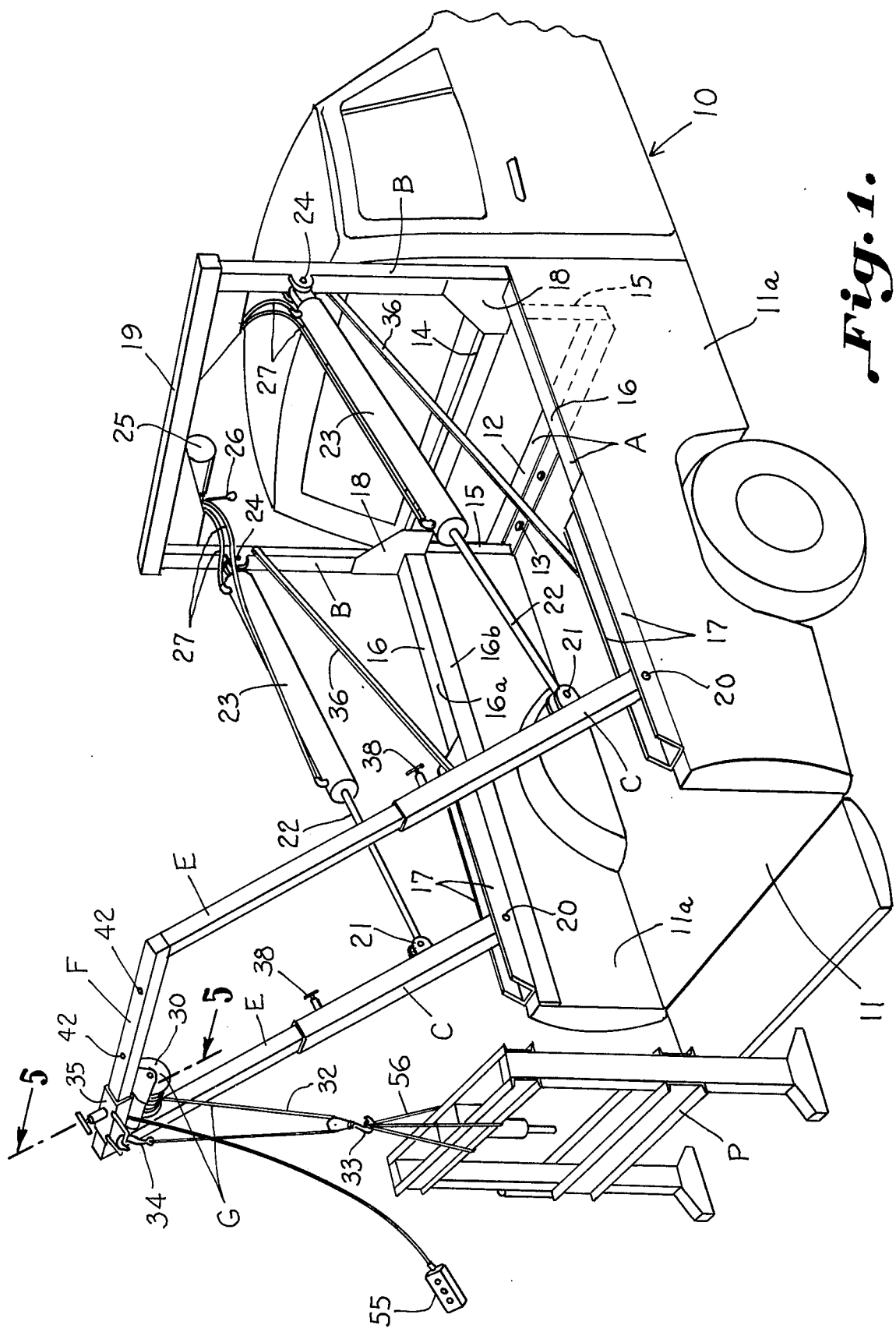
FIG. 1 is a schematic perspective view looking toward the rear of the bed of a pickup truck illustrating a device constructed in accordance with the present invention positioned thereon having raised a load preparatory to placing same on the bed of the truck.
Figure 2:
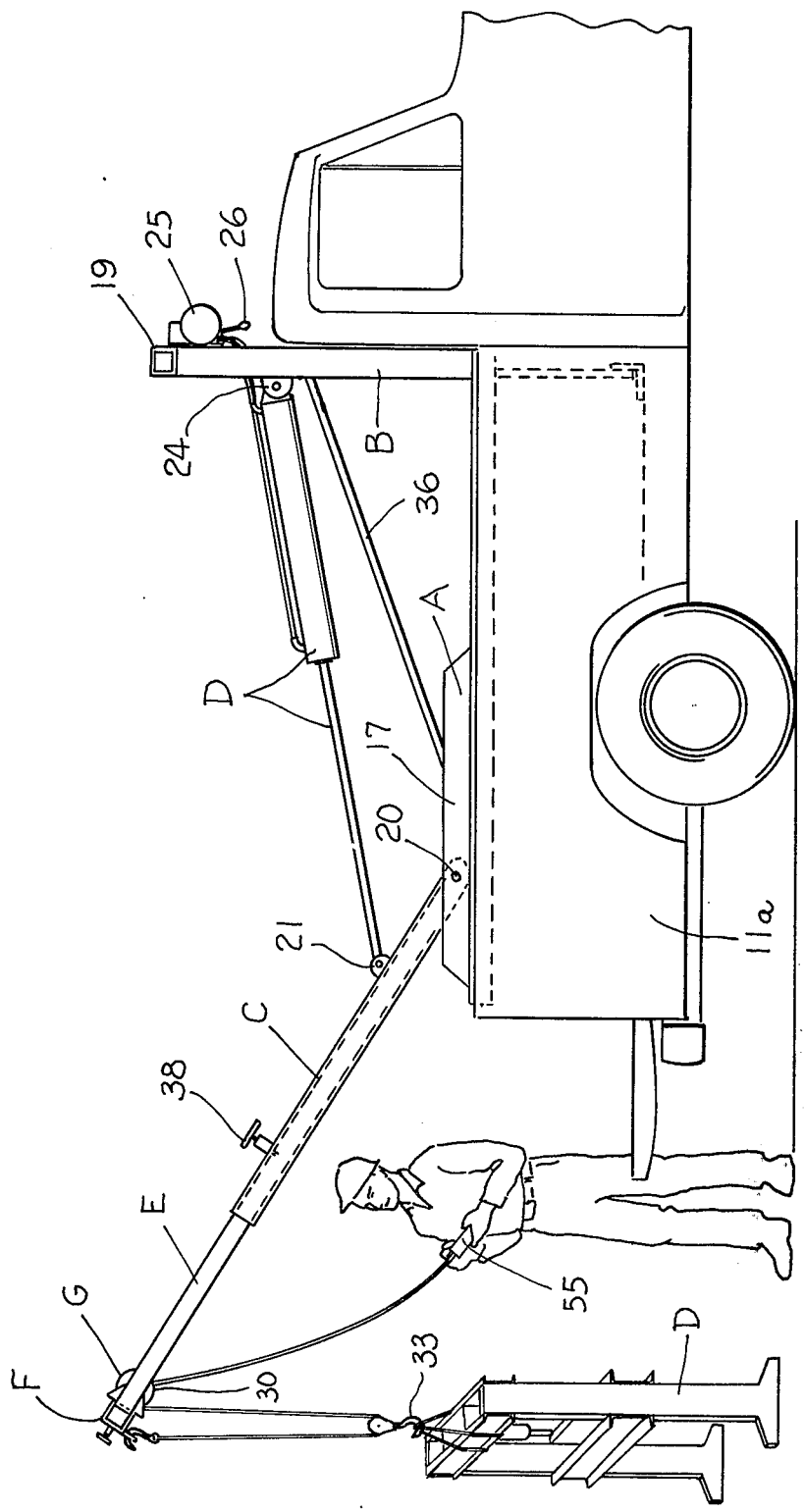
FIG. 2 is a side elevation further illustrating a device constructed in accordance with the present invention with the load being secured thereto preparatory to raising same to the position shown in FIG. 1.

The drawings illustrate a loading device for wheeled vehicles having an elongated bed. A supporting frame A having marginal portions is carried by and extends adjacent side portions of the bed. A pair of spaced transversely aligned standards B are fixed adjacent respective forward marginal portions of the supporting frame and extend upwardly therefrom. A pair of transversely aligned boom members C are each pivotally carried on one end thereof adjacent the supporting frame rearwardly of the standards. A pair of aligned fluid operated piston and cylinder assemblies D each have pivotal connection on opposite ends thereof on a respective standard and boom. A longitudinally adjustable extension member E is carried by each of the boom members. A transverse briding member F joins the extension members remote from the boom members. A winch operated load securing means G is carried adjacent the bridging member.

The drawings illustrate a pickup truck broadly designated at 10 having a bed 11 with spaced vertical sides 11a. The bed of the truck also has a frame member (not shown) to which a lower transverse portion 12 of the frame A is attached as by bolts 13. The frame A has an upper transverse portion 14 joined by vertical frame members 15 carried adjacent the corner of the loading body formed by the bed 11 and sides 11a at a forward portion thereof. The frame A also includes an angle member 16 having an upper flange 16a and a vertical flange 16b forming marginal portions extending adjacent the side portions 11a of the pickup adjacent the top thereof. Rearwardly of the truck the frame A carries along an upper portion or the horizontal flange 16a, a channel shaped member having upwardly extending flanges 17 for pivotally carrying the boom members therebetween.

Figure 4:
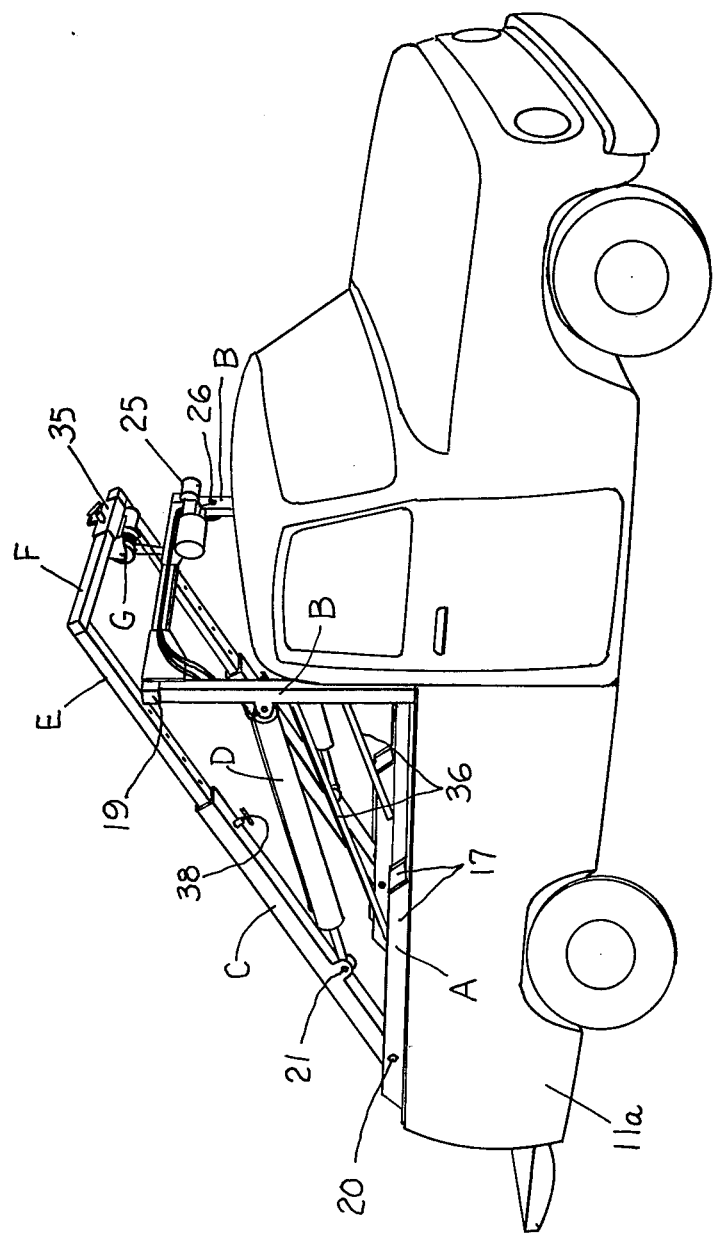
FIG. 4 is a perspective view similar to FIG. 3 showing the boom of the apparatus in collapsed position fully forward preparatory to moving the vehicle.

The spaced transverse standards B are in the form of tubular structural members which are provided with reinforcing means 18 insuring a rigid connection with the frame A. The standards B are bridged at the top by a transverse member 19 which serves to support the boom in a position of rest for transport as illustrated in FIG. 4.

The boom members C are illustrated in the form of tubular structural members which are pivoted as at 20 between the flanges 17 of the frame A. Tubular boom members C have pivotal connection as at 21 with a piston rod 22 which forms a part of the fluid operated cylinder assembly D. The cylinders 23 respectively, are pivotally mounted in respect to the frame as at 24 to the standards B. A suitable pump assembly 25 is carried adjacent the transverse member 19 and is operated by the lever 26 for operating the hydraulic cylinders through a suitable line 27 for raising and lowering the booms C.

The longitudinally adjustable extension members E, together with the transverse bridging member F form an inverted extensible U-shaped boom member which is telescopically carried within the boom members C which together form a U-shaped arrangement for accommodating tall loads such as a press designated at P in the drawings. The press is suitably secured to the transverse bridging member F by a winch operated load securing means G. The winch operated load securing means G includes a pulley 30 which is operated by an electric motor 31 for tightening the line 32 which carries a hook 33 for securement to the load. The line 32 is secured as by the hook 34 adjacent the slidable support 35 which carries the pulley 30 for securing advantage in raising the load T.

Figure 3:
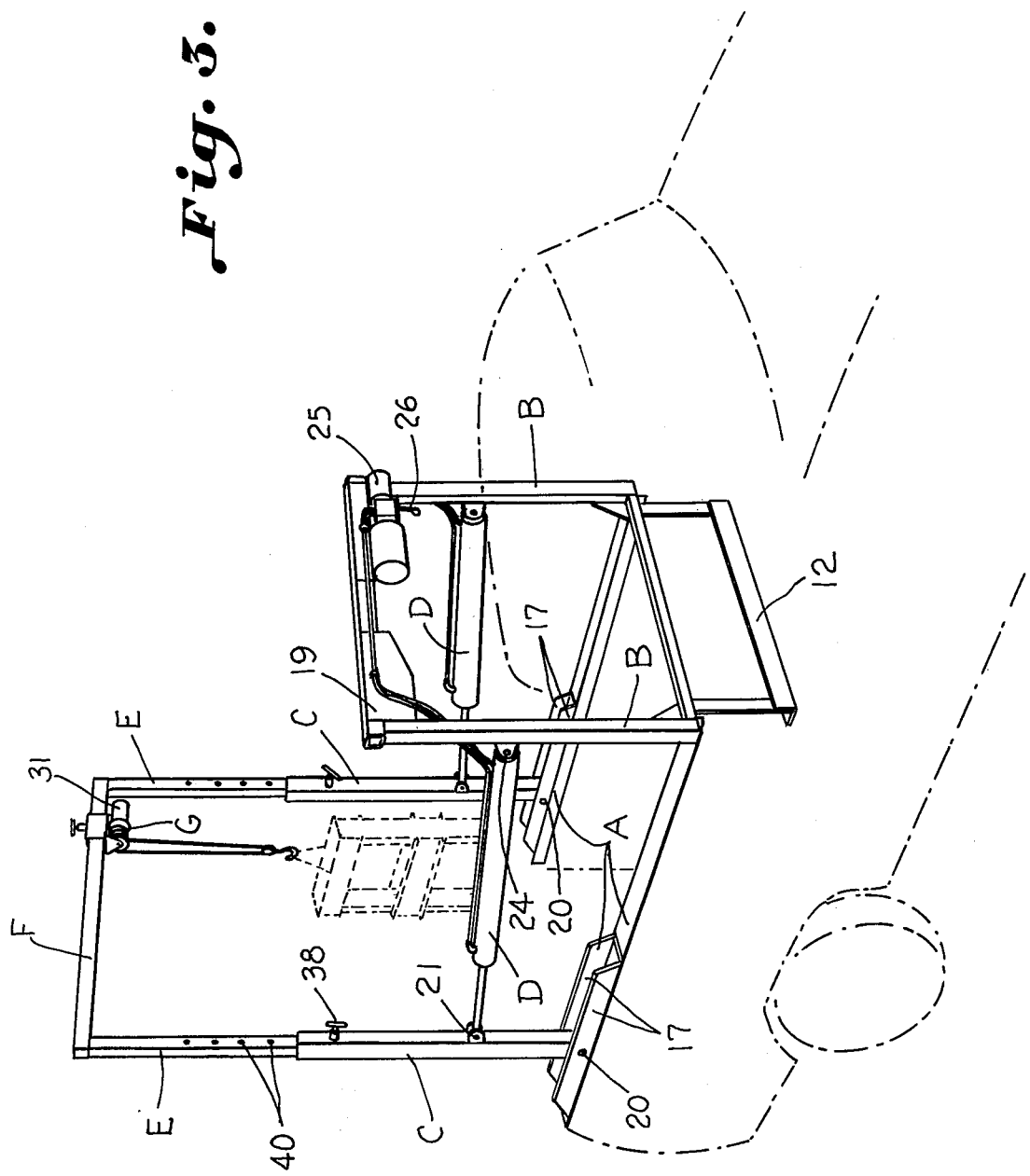
FIG. 3 is a perspective view looking toward the front of the vehicle illustrating apparatus constructed in accordance with the present invention in raised position moving the load forwardly of the bed of the pickup truck.
Figure 5:
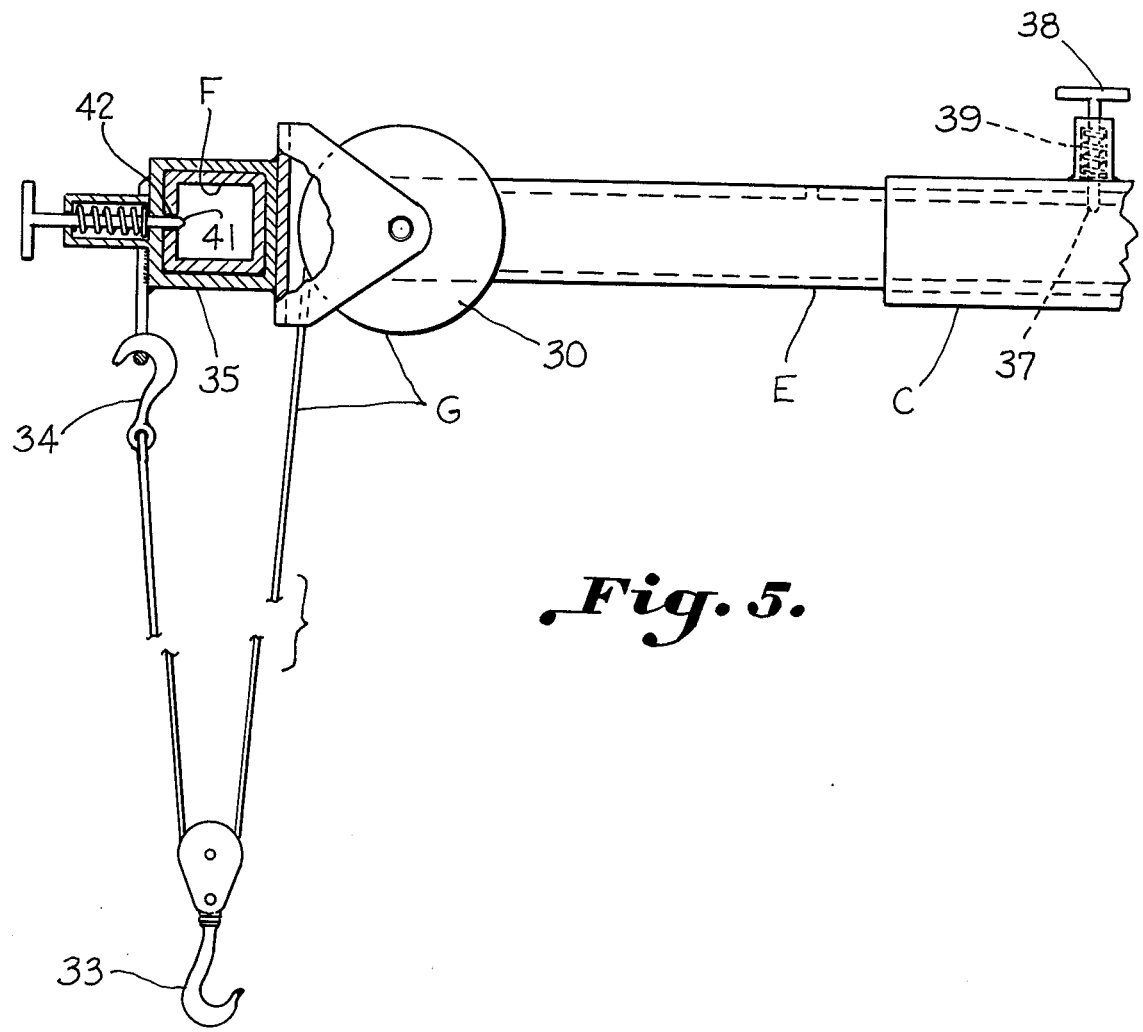
FIG. 5 is a transverse sectional elevation taken on the line 5—5 in FIG. 1 illustrating the winch operated load engaging means carried by the boom.

It will be noted that a pair of spaced supports 36 are rigidly connected as by welding adjacent each end for adding rigidity to the frame which is formed essentially by the marginal members 16 of the frame A and the standards B. The extensible members E are secured in an adjusted position as desired by spring biased plungers 37 (FIG. 5) which may be withdrawn by pulling upon the handles 38 against the force of the spring 39 for removing the plunger from spaced holes or openings 40 carried in the extensivle members E (FIG. 3). FIG. 5 also illustrates the slidable support 35 for the sheave arrangement G which carries a plunger 41 for insertion into one of the openings 42 (FIG. 1) provided in the transverse bridging member F.

Figure 6:
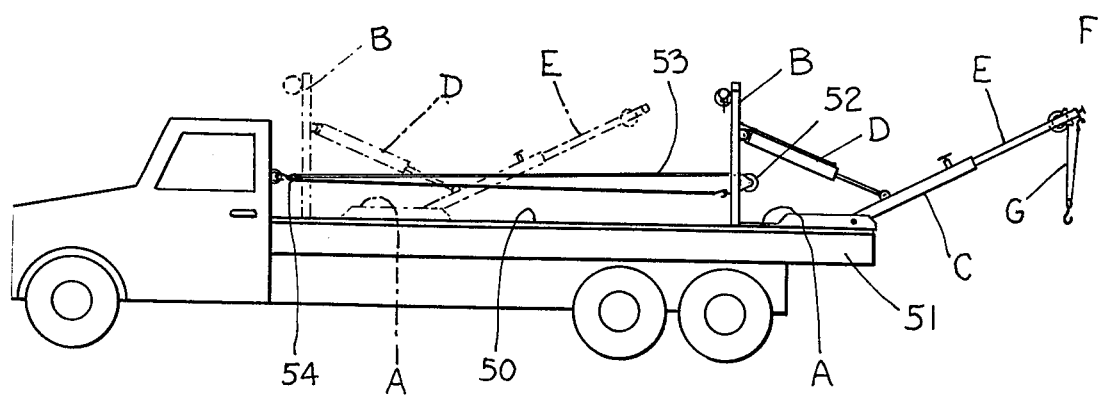
FIG. 6 is a side elevation illustrating a modified form of the invention.

FIG. 6 illustrates a modified form of the invention wherein spaced rails 50 extend along the bed 51 of a truck for moving the assembly constructed in accordance herewith longitudinally along the bed. A winch is illustrated at 52 for operating cables 53 secured as at 54 adjacent the forward portion of the bed for moving the assembly along the rails 50 for permitting the raising of a load with the device positioned rearwardly on the bed and then moving same forwardly, as to broken line position, to secure the load in a forward position of the bed so as to sequentially load the elongated bed of the truck.

In order to further accommodate the loading of the truck, a remote control switch assembly 55 (FIG. 1) may be provided to facilitate engagement with the winch G with the load P. This is accomplished by inserting the hook 33 about a sling arrangement 56 for engaging the load. The winch need not be capable of lifting the load but may merely take the slack out of the cable 32.

It will thus be observed that the apparatus hereof is operable externally of the cab utilizing the switch 55 to operate the winch and the lever 26 for operating the hydraulic arrangement for raising and lowering the boom assembly formed by the extensible U-shaped portion as carried by the boom members C. The transverse bar adjacent the forward portion of the bed serves as a stop therefor when the vehicle is moving. If an extra tall item is to be loaded upon the truck the boom may be extended through the plunger members to an adjusted extended position.

While a preferred embodiment of the invention has been described using specific terms, such description is for illustrative purposes only, and it is to be understood that changes and variations may be made without departing from the spirit or scope of the following claims.

What is claimed is:

1. A loading device for wheeled vehicles having an elongated loading bed comprising:
 a supporting frame having marginal portions adjacent marginal portions of said bed;
 a pair of spaced transversely aligned standards fixed adjacent respective forward marginal portions of said supporting frame and extending upwardly therefrom;
 a pair of transversely aligned boom members each pivotally carried on one end thereof adjacent said supporting frame rearwardly of said standards in longitudinal alignment therewith;
 a pair of aligned fluid operated piston and cylinder assemblies each having pivotal connection on opposite ends thereof on a respective standard and boom member;
 a transverse bridging member joining said boom members; and
 a load securing means carried adjacent said bridging member independent of said standards.

2. A loading device for wheeled vehicles having an elongated loading bed comprising:
 a supporting frame having marginal portions extending adjacent side portions of said bed;
 a pair of spaced transversely aligned standards fixed adjacent respective forward marginal portions of said supporting frame and extending upwardly therefrom;
 a pair of transversely aligned boom members each pivotally carried on one end thereof adjacent said supporting frame rearwardly of said standards;
 a pair of aligned fluid operated piston and cylinder assemblies each having pivotal connection on opposite ends thereof on a respective standard and marginal portion;
 a longitudinally adjustable extension member carried by each of said boom members;
 a transverse bridging member joining said extension members remote from said boom members; and
 a winch operated load securing means carried adjacent said bridging member.

3. The structure set forth in claim 2 including means for telescopically adjusting said extension members in respect to said boom members and means for adjustably mounting said winch load securing means on said bridging member for lateral adjustment in respect to said bed.

4. The structure set forth in claims 2 or 3 including bridging means connecting said standards for receiving said extension members.

* * * * *